Sept. 24, 1963 W. T. RENTSCHLER 3,104,601
PHOTOGRAPHIC CAMERA WITH AUTOMATIC EXPOSURE SETTING
Filed Dec. 8, 1960 2 Sheets-Sheet 2
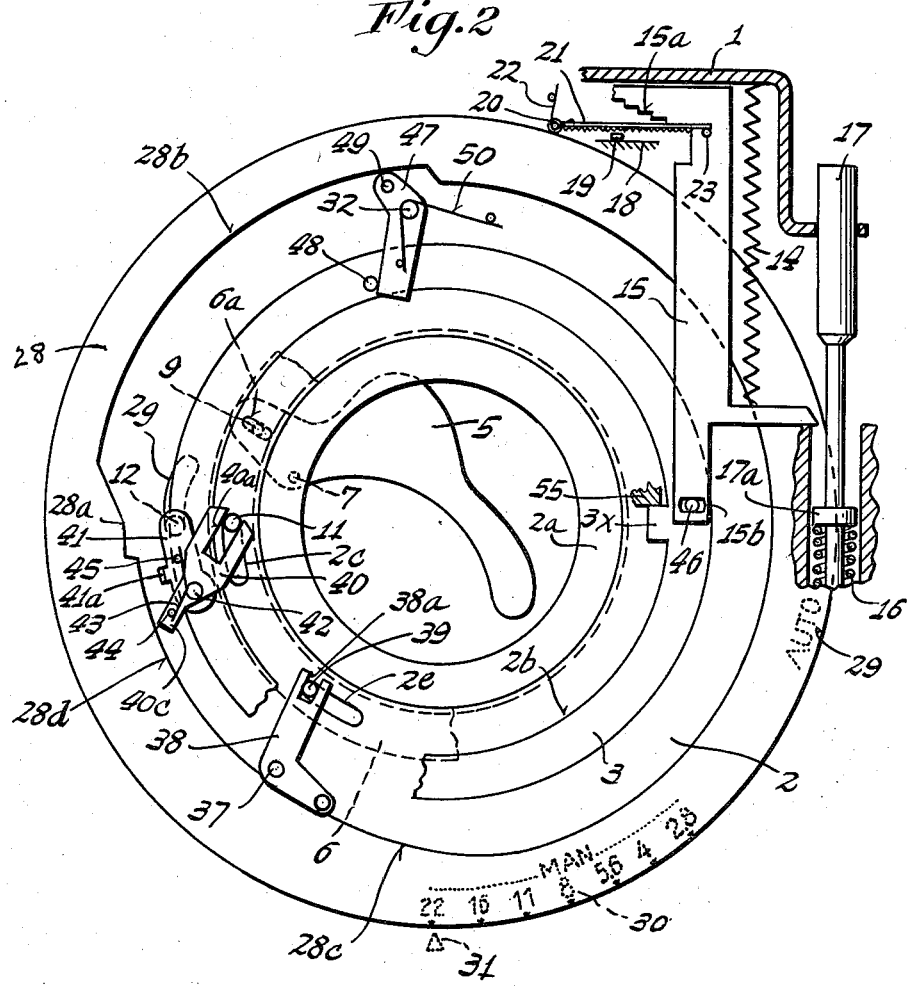
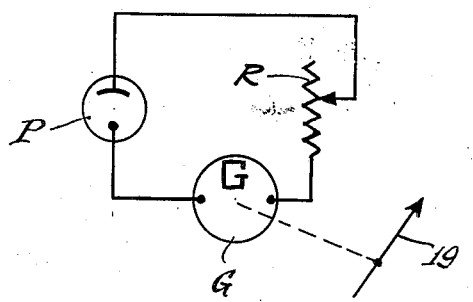
INVENTOR.
Waldemar T. Rentschler
BY March and Curtiss
ATTORNEY

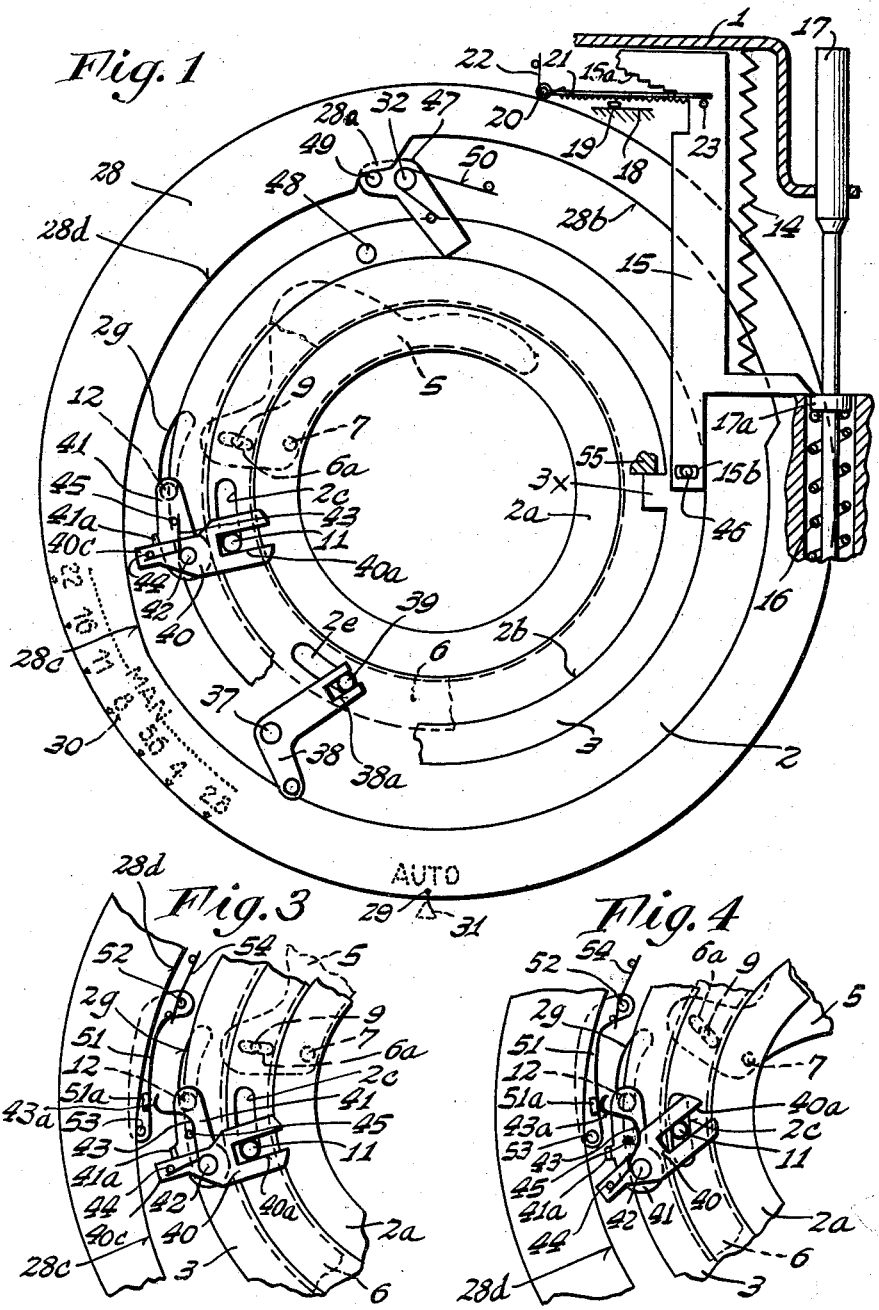

United States Patent Office 3,104,601
Patented Sept. 24, 1963

3,104,601
PHOTOGRAPHIC CAMERA WITH AUTOMATIC EXPOSURE SETTING
Waldemar T. Rentschler, Calmbach (Enz), Germany, assignor to Alfred Gauthier, G.m.b.H., Calmbach (Enz), Germany, a corporation of Germany
Filed Dec. 8, 1960, Ser. No. 74,637
Claims priority, application Germany Dec. 12, 1959
3 Claims. (Cl. 95—10)

In this prior identified application there is described and illustrated a photographic camera having a settable diaphragm provided in the lens assemblage, and having a movable transmission member (as for example a pivotal transmission lever) which is carried by the diaphragm setting member, such lever being connected on the one hand to the diaphragm actuating member which adjustably shifts the diaphragm segments, and engaging on the other hand a fixed cam guide by which a predetermined control is had over the movements of the lever to provide the desired diaphragm adjustment characteristic.

A diaphragm setting mechanism constructed in accordance with the invention of this copending application has the advantage that the extent of movement required in order to adjust the diaphragm from one extreme position to the other need be only relatively small, and the further advantage that the necessary control of the movement of the diaphragm actuating member, by which there is obtained the desired adjustment characteristic of the diaphragm, is had in a simple and economical manner.

Other features of the camera disclosed in the identified copending application reside in the organization wherein the setting member for the diaphragm cooperates with a known type of light intensity measuring device to effect diaphragm adjustment, and wherein for the purpose of extending the range of usefulness of the camera there is provided a manually operable selector means which can be set at "automatic" or "non-automatic" positions and by means of which the diaphragm can be conditioned for either automatic setting or manual setting, the selector in the latter case constituting a manually operable setting member for the diaphragm.

An object of the present invention is to provide an improved automatic camera setting mechanism of the general type set forth in the above identified copending application, which mechanism obtains the above stated advantages while at the same time it has the further advantage that there is required but a minimum adjusting force when the camera is set for automatic adjustment of the diaphragm.

This is accomplished, in accordance with the invention, by the provision of a transmission means which is movably carried by the diaphragm setting member and which comprises two mutually engageable members or parts which are drivingly connected to each other by a uni-directional, tensional driving connection involving a spring and abutment surfaces, one of such members or parts being connected to the actuating member which adjusts the diaphragm lamellas or segments whereas the other member or part is engaged with a guide slot constituting a stationary cam. The arrangement is such that, upon a selector means being positioned at its "automatic" setting the said two members or parts are adjustable as a unit in response to the movement of the diaphragm setting member which cooperates with the light intensity measuring device. When the selector is positioned at its "non-automatic" setting, one member or part is moved, in response to the adjustment of the diaphragm actuating member, relative to the other part and against the action of the associated spring which establishes the tensional or uni-directional driving connection between the two parts.

By such organization there is provided, in accordance with the invention, the advantageous result that with the automatic setting of the diaphragm no elastic forces which influence the diaphragm mechanism are required to be overcome. Accordingly, it is possible to obtain adjustment of the diaphraghm utilizing a moment of force of the smallest possible magnitude. This is of considerable importance when considering the driving mechanism which is utilized to effect the automatic setting of the diaphragm, since such driving mechanism in accordance with the invention may utilize small-dimensioned driving devices involving small forces, which may be economically fabricated. In addition to the foregoing advantage there is the further advantage that the small moment of force required in effecting adjustment of the diaphragm enables a "soft" and hence vibrationless release operation to be had, in depressing the camera release plunger.

A further construction as provided by the invention is characterized by a control device which may be made operative in response to the selector being set in its "non-automatic" position, such control device operating to release or render inoperative the tensional connection between the two transmission parts of the levers carried by the diaphragm setting member.

Such organization results in a complete release or relief from pressure of the part engaged with the fixed guide slot during manual setting of the diaphragm, and accordingly results in a minimum amount of wear of these associated parts.

An embodiment of the invention is illustrated in the accompanying drawings, in which:

FIG. 1 is an enlarged rear elevational view of a photographic intra-lens shutter assemblage of the type which is attachable to a camera case. Arranged within the housing of the assemblage is a segment-type diaphragm and a diaphragm setting mechanism as provided by the invention, such mechanism cooperating with an automatic exposure setting device. The selector of the mechanism is shown in the "automatic" position, and the diaphragm is shown in the position which provides the largest opening or aperture.

FIG. 2 is a view similar to that of FIG. 1 but showing the selector in its non-automatic or "manual" position.

FIG. 3 is a fragmentary rear view of an intra-lens shutter assemblage as provided by the invention, illustrating a control device for releasing or rendering inoperative the tensional connection between the diaphragm operating and diaphragm setting members. The said control device is shown in its inoperative position, which is associated with the "automatic" position of the selector.

FIG. 4 is a view similar to that of FIG. 3, but showing the position of the control device and associated parts with the selector placed in the non-automatic or "manual" position.

FIG. 5 is a schematic circuit diagram illustrating a well known exposure regulator arrangement of the type which may be utilized with the present diaphragm adjusting mechanism.

Those members and components in the figures which are similar to corresponding members or components in the camera of the above identified copending application have been given the same reference numerals.

Considering first FIGS. 1 and 2, the housing or case of the photographic camera is indicated by the numeral 1, just as in the identified copending application. Affixed to the front wall of the case 1 in a well known manner is a photographic intra-lens shutter assemblage comprising a shutter housing 2. Arranged within the housing 2 is an adjustable segment-type diaphragm having lamellas or segments 5, which is cooperable with the lens system of the camera (the latter being not shown for reasons of clarity of illustration). The carrier or mounting for the lens of the lens assemblage may be a well-known tubular connection or nozzle (not shown) provided on the front of the shutter assemblage. Also provided is a tubular connecting nozzle or socket 2a of similar construction, provided on the rear wall of the shutter housing 2.

The diaphragm mechanism comprises a diaphragm setting ring 3 which bears on the rear of the shutter housing, being engaged with a bearing attachment 2b thereof, such mechanism also including a diaphragm actuating ring 6 which is located on the inside of the rear wall of the shutter housing 2. The diaphragm segments 5 are constructed in the shape of sectors, and have pin-and-slot connections 6a, 9 with the diaphragm operating or actuating ring 6. In addition, the diaphragm segments 5 have bearing pins 7 which engage the edges of (as shown in the identified copending application) and extend into apertures of a bearing plate which is fixedly screwed on the inside of the rear wall of the shutter housing 2.

On the diaphragm setting ring 3 (in the construction illustrated and described in the above identified copending application) a pivotally movable lever 4 is provided, serving to connect the diaphragm setting ring 3 and the diaphragm operating ring 6. The said lever 4 is connected on the one hand with the actuating ring 6 and engages, on the other hand, a fixed guide or cam 2d.

In accordance with the present invention, instead of a single lever (identified by the numeral 4 in the copending application) there is provided a multi-part transmission means which is movably carried by the diaphragm setting ring 3 and which comprises two mutually engageable members or parts which are tensionally connected to each other by means of abutment surfaces and a spring, such parts having a uni-directional driving connection thereby established between them.

In the illustrated embodiment of the invention the said two parts have the reference numerals 40 and 41, such parts having a common pivot pin or axis 42 which is affixed to the diaphragm setting ring 3. A spring 43 establishes the tensional connection between the two parts 40 and 41, such spring extending about the pivot pin 42 and engaging pins 44 and 45 respectively of the parts. The part 40 has a pin-and-slot connection 40a, 11 with the diaphragm operating or actuating ring 6, there being a clearance slot 2c in the rear wall of the shutter housing 2 through which the pin 11 extends. For the purpose of obtaining the desired adjustment characteristic of the diaphragm, the other part 41 has a cam follower 12 arranged to engage a cam guide in the form of a slot 2g provided in the rear wall of the shutter housing. This organization makes it possible, upon placing a selector ring 28 which is to be described shortly in "automatic" position, to adjust the said two parts as a unit and to shift the same in response to movement of the diaphragm setting ring 3, such ring being connected to a light intensity measuring device (also to be shortly described below) so as to be automatically shifted thereby.

The part 40 is arranged by means of its arm 40c to engage the lug or tab 41a of the cooperable part 41 under the influence of a spring 43 (FIGS. 1 and 3). During such action no elastic or yieldable forces are required to be overcome within the diaphragm mechanism, and accordingly adjustment of the diaphragm may be effected with the smallest possible moment of force. However, if the above mentioned selector 28 is in its "non-automatic" position, the part 40 is moved with respect to the part 41 in response to adjustment and shifting of the diaphragm actuating ring 6, against the action of the spring 43 which establishes the tensional connection between the two parts. For such action the diaphragm setting ring 3 is retained in an initial or end position, in a manner to be described below. This is shown in FIG. 2, wherein the setting ring 3 is shifted to the maximum extent in a counter-clockwise direction, being halted by a fixed abutment 55.

By the provision of two mutually engageable, tensionally connected control parts having a uni-directional driving connection for influencing or adjusting the diaphragm there is had the advantage on the one hand that the fixed cam or guide which serves to provide a desired adjustment characteristic of the diaphragm (when taking photographs utilizing the automatic exposure setting means) may be constructed as a closed guide or slot the control influence of which may be transferred to the diaphragm without having recourse to springs which otherwise increase the moment of adjustment or moment of force required in adjusting the diaphragm. On the other hand, upon manual setting of the diaphragm the said closed slot type of guide has no deleterious effect and its construction therefore need not be taken into consideration at all.

The light intensity measuring device which is associated with the diaphragm setting ring 3 is constructed in the same manner as that of the camera illustrated and described in the identified copending application. Such measuring device may comprise a vertically movable sensing member 15 having a pin-and-slot connection 46, 15b with the diaphragm setting ring 3, such member enabling a sensing, in a well known manner to be described below, to be had of the position of the movable member of the measuring mechanism of an exposure meter which is built into the camera. Such sensing occurs in response to depressing movement of the camera or shutter release 17, which is shown in FIGS. 1 and 2 as being movable against the action of a return spring 16. The sensing member 15 is acted on by a spring 14 which tends to maintain it in engagement with a collar or flange 17a provided on the camera release plunger 17. The spring 14 is weaker than, and may be overcome by the spring 16 which influences the release plunger 17, so that normally the sensing member 15 occupies the position shown in FIG. 1 when the camera release is not being depressed. In order to be cooperable with the movable member of the measuring mechanism, which member may for example comprise a rotating coil of a well-known galvanometer instrument indicated at G in FIG. 5. The galvanometer G is energized by a photoelectric cell P, there being a calibrating resistor R disposed in the energizing circuit, all as shown in FIG. 5. The sensing member 15 has a stepped control or abutment edge 15a arranged to engage (in response to actuation of the camera release plunger 17) under the action of the spring 14 a needle 19 which is connected to the movable member or rotating coil of the exposure meter measuring mechanism. The needle 19 is movable over a base or table surface 18, against which it may be clamped. Prior to carrying out the sensing operation, the needle 19 is secured in any of its adjusted positions by means of a clamping device by which such clamping is effected. This clamping device comprises a pivotally movable lever 21 movable about a fixed axis 20 and engaging, under the action of a spring 22, a pin 23 affixed to the sensing member 15 when the said member 15 is in its starting position. For such position of the lever 21 the needle 19 is freely movable over the base or table surface 18. However, when the sensing operation is initiated by actuation of the camera release 17, the lever 21 first engages, by means of its serrated under surface, the needle 19, pressing the same against the base 18. In order to obtain during such operation an initial free movement of the sensing member 15 for which such clamping will occur, the diaphragm is opened (when adjusted to provide the largest aperture corresponding to the initial starting or end position of the setting member 3 shown in FIGS. 1 and 2) slightly more than the largest required diaphragm value, which for example may be 2.8. In this manner the diaphragm has a preliminary path of movement within which the clamping of the needle 19 is effected by the lever 21 upon actuation of the camera release 17.

The selector 28 which at the same time also serves as the manual setting member for the diaphragm is, in the present embodiment of the invention just as with the construction of the identified copending application, constructed as a rotatable ring which is concentric with the optical axis and has a bearing on the shutter housing 2 in a manner which is not shown in the drawing. For setting purposes the ring 28 has a mark 29 comprising the word "auto" as well as a diaphragm scale 30 which latter is associated with the word "man." The setting mark 29 and the scale 30 are cooperable with a fixed index mark 31, (see FIGS. 1 and 2).

For the purpose of disconnecting or rendering inoperative the automatic setting device for the diaphragm in response to placing the selector 28 in the position associated with the word "man" the diaphragm setting ring 3 is arranged to be retained in an initial starting or end position as shown in FIG. 2. To effect such retention there is provided a lever 47 which is pivotally movable about a pin 32 affixed to the rear wall of the shutter housing 2, said lever cooperating on the one hand with the selector ring 28 and on the other hand with a pin 48 affixed to the diaphragm setting ring 3. Such cooperation and action is such that upon the selector 28 being positioned in the "automatic" position shown in FIG. 1 the detent lever 47 engages, by means of a pin 49 affixed thereto and under the action of a biasing spring 50, a notched edge portion 28a provided on the selector ring 28 whereby the selector is releasably held in the automatic position. For such position the lever 47 is outside of the path of movement of the pin 48 so that the lever and its spring 50 have no influence on the adjusting movement of the diaphragm setting ring 3.

When the selector ring 28 is placed in the position associated with the word "man," the pin 49 of the lever 47 becomes disengaged from the detent means 28a and clearance is provided for the lever by virtue of the provision of a cut back concentric portion 28b the extent or length of which corresponds to the size of the manual setting range of the selector.

Upon such clearance being effected for the lever 47 it pivots clockwise under the action of the spring 50 and becomes engaged with the pin 48 of the diaphragm setting ring 3, thus shifting the latter to and retaining it in the end position associated with the largest diaphragm aperture, which is shown in FIG. 2.

A selector device constructed in the above manner for rendering the automatic exposure setting mechanism either operative or inoperative has a high operational accuracy as well as being simple in construction, economical to fabricate and easy to adjust. These advantages are had by virtue of the fact that the disconnecting device, namely the spring 50 has its own driving force to effect movement of the diaphragm setting ring 3 into the starting position of FIG. 2, such position being defined by engagement between a fixed stop 55 and an inwardly extended lug 3x provided on the inner periphery of the ring 3. It will be noted that the setting ring 3 is retained in the initial starting position without looseness or play. The selector 28 upon being shifted to the non-automatic diaphragm setting position thus merely has the task of releasing the adjusting spring 50 to enable the latter to become operative, whereupon the diaphragm setting ring 3 is forced to move to the position associated with the largest diaphragm aperture as determined by the fixed stop 55, under the action of the spring 50. The selector 28 when it is shifted from the automatic to the non-automatic position thus merely is required to engage in a passive act, the release of the lever 47, whereupon the spring 50 becomes operative to cause the lever 47 to engage the pin 48 and move the diaphragm setting ring 3 to the position corresponding to the largest diaphragm aperture as illustrated in FIG. 2. This mode of operation results in the elimination of any play or looseness in the connection between the selector 28 and the diaphragm setting ring 3, which might produce inaccuracies in the diaphragm setting. In addition, there is avoided the necessity of using more complicated control devices involving additional expenditure as well as a difficult adjustment, between the selector 28 and the disconnect means which renders inoperative the automatic adjusting mechanism.

In order to adjust the diaphragm when the selector 28 is placed in the manual position, an additional cam 28c is provided on the selector, to which the diaphragm actuating ring 6 may be operably connected. In order to establish such connection, a bell crank or angle lever 38 is movably mounted on an axis 37 provided on the rear wall of the shutter housing, such bell crank being on the one hand connected by means of a pin-and-slot connection 38a, 39 with the diaphragm actuating ring 6 and engaging on the other hand the cam 28c when the selector 28 is placed in the "man" position, in the manner shown in FIG. 2. A clearance slot 2e is provided in the rear wall of the shutter housing for the pin 39.

For the purpose of eliminating any influence on the movement of the diaphragm setting ring 3 by virtue of the cam means 2g, 12, thereby to eliminate wear and effect the utmost freedom of movement of the diaphragm adjusting mechanism when the selector 28 is placed in its "non-automatic" position, the invention further provides a novel control device which is made operative in response to placing the selector 28 in the "non-automatic" setting, said control device releasing the tensional connection between the two lever parts 40 and 41. Such control device also makes it possible to avoid going to changes in the shown configuration of the control slot 2g, by which there is in consequence had an optimum freedom of movement of the diaphragm setting ring 3 during automatic exposure settings.

FIGS. 3 and 4 show an embodiment of such control device. The said control device comprises a lever 51 which is pivotally movable about a fixed axis or pivot pin 52 provided on the rear wall of the shutter housing 2. The lever 51 has a pin 53 which is engageable, under the action of a spring 54, with the cam 28c of the selector 28, as well as with the concentric cam 28d of the selector ring. In addition, the lever 51 has a lug 51a by which it cooperates with a bent end 43a of the spring 43, such end being carried by the portion of the spring which engages the pin 45 of the lever part 41. The action of the lever 51 is such that when the selector 28 is placed in the "automatic" position, it (the lever) is out of engagement with the portion 43a of the spring 43, so that the latter may engage the pin 45 to maintain the uni-directional driving connection between the transmission parts 40 and 41.

Upon placing the selctor ring 28 in the position associated with the word "man" the cam 28d imparts to the lever 51 a pivoting movement against the action of a spring 54, whereby the lugs 51a of the lever engages the end 43a of the spring 43. This shifts the spring 43 so that it no longer engages the pin 45 of the part 41 but instead continues in engagement with the lug 51a of the lever 51. This results in a complete relief from pressure and wear on the cam slot 2g for the manual setting of the diaphragm.

The mode of operation of the setting mechanism, and the method of operating the camera employing the same, is as follows:

(a) *Carrying out an exposure utilizing an automatic exposure setting.*—For this purpose, the selector 28 is placed in the position shown in FIG. 1, wherein the (auto) setting mark 29 is adjacent the index mark 31. If now the camera release 17 is depressed, this movement is followed by the sensing member 15 moving downward and by the diaphragm setting ring 3 moving clockwise under the action of the spring 14, during which operation the measuring mechanism needle 19 is first clamped by means of the lever 21. The adjusting movement of the setting ring 3 is transmitted to the diaphragm actuating ring 6 by means of the transmission parts 41, 40, said two parts being adjusted as a unit. At the same time, the guide slot 2g imparts to such unit the pivoting movement required for obtaining the prescribed adjusting characteristic of the diaphragm. The automatic setting of the diaphragm is terminated when one of the steps 15a of the sensing member 15 comes in contact with the measuring mechanism needle 19. Upon further depression of the camera release 17 the shutter is released and an exposure is carried out.

(b) *Carrying out an exposure with manual setting of the diaphragm.*—This is done by placing the selector ring 28 in the manual setting, and adjusting the ring so that the desired diaphragm value on the scale 30 is adjacent the index mark 31. For this setting the cam or portion 28b of the selector provides clearance for the pin 49 of the lever 47 so that, independently of depressing movement of the camera release 17, the diaphragm setting ring 3 is retained by means of the lever 47 in its starting position as determined by the stop 55 being engaged by the lug 3x.

The diaphragm aperture will be at its largest value, since the spring 50 of the lever 47 overcomes the spring 14 of the sensing member. At the same time, the above mentioned pressure relief device 51, 51a influencing the spring 43 becomes operative to relieve pressure of the part 41 against the guide slot 2g. Also, with such setting of the selector 28 the cam 28c engages the lever 38 and pivots the same in a counterclockwise direction, thereby setting the diaphragm at the value indicated by the scale 30.

I claim:

1. In a photographic camera of the type having an adjustable diaphragm in the lens assembly, in combination, a setting member for the diaphragm; a transmission means movably carried by the setting member, said means comprising two mutually engageable parts having a unidirectionally acting driving connection with each other, a spring engaged with and normally holding said parts in driving engagement; a diaphragm operating member; a driving connection between one of said transmission parts and said operating member; a stationary cam slot engaged by the other transmission part for controlling the movement of the transmission means and in consequence the movement of the diaphragm operating member as the said setting member is adjusted; a light-intensity measuring device and means controlled thereby for effecting automatic adjustment of the diaphragm setting member; a movable selector settable in "automatic" and "non-automatic" positions; and control means responsive to placing the selector in its "on-automatic" position, for shifting the said one transmission part relative to the said other transmission part against the action of the said spring.

2. A camera as in claim 1, in which there is a control device responsive to placing the selector in its "non-automatic" position for shifting said spring out of engagement with the said other transmission part to render inoperative the driving connection between the two transmission parts.

3. A camera as in claim 1, in which there is a spring-biased lever movable about a fixed axis, in which there is a unidirectionally positive driving connection between the diaphragm setting member and said lever whereby the latter under the action of its spring can shift the member to an initial end position against an end stop, and in which there are means for rendering said lever inoperative to effect such shifting in response to placing the selector in its "automatic" position.

References Cited in the file of this patent

UNITED STATES PATENTS

| | | |
|---|---|---|
| 2,061,909 | Karg | Nov. 24, 1936 |
| 2,838,985 | Burger et al. | June 17, 1958 |
| 2,913,969 | Faulhaber | Nov. 24, 1959 |
| 2,952,199 | Burger et al. | Mar. 14, 1960 |
| 2,969,004 | Gebele | Jan. 24, 1961 |